United States Patent [19]
Barsell

[11] 4,032,746
[45] June 28, 1977

[54] CONTROL SYSTEM FOR A FUSING APPARATUS

[75] Inventor: Howard J. Barsell, Rochester, N.Y.

[73] Assignee: Xerox Corporation, Stamford, Conn.

[22] Filed: Nov. 10, 1975

[21] Appl. No.: 630,470

[52] U.S. Cl. .............................. 219/216; 219/494; 219/501; 219/505
[51] Int. Cl.² .......................................... H05B 1/02
[58] Field of Search .......... 219/210, 216, 388, 494, 219/501, 505; 307/310

[56] References Cited

UNITED STATES PATENTS

| 3,007,023 | 10/1961 | Johnston et al. .................. 219/210 |
| 3,532,855 | 10/1970 | Van Cleave ..................... 219/501 X |
| 3,584,291 | 6/1971 | Budnick ......................... 219/501 X |
| 3,869,597 | 3/1975 | Strange .......................... 219/501 X |

Primary Examiner—C. L. Albritton
Attorney, Agent, or Firm—J. J. Ralabate; H. Fleischer; C. A. Green

[57] ABSTRACT

A control system in which the thermal energy produced by a first heat source and a second heat source cooperating therewith is regulated by adjusting the phase of the voltage applied thereto.

10 Claims, 7 Drawing Figures

CONTROL SYSTEM FOR A FUSING APPARATUS

BACKGROUND OF THE INVENTION

This invention relates generally to an electrostatographic printing machine, and more particularly concerns a control system employed to regulate the temperature of a fusing apparatus incorporated therein for affixing permanently a powder pattern, in image configuration, to a sheet of support material.

In the process of electrostatographic printing, electrostatic latent charge patterns are formed, and thereafter, rendered viewable. The field of electrostatography includes electrophotographic printing and electrographic printing. Electrophotographic printing is a class of electrostatographic printing which employs a photosensitive member to form, with the aid of radiation, a latent image. Electrographic printing utilizes an insulating member to form, without the aid of radiation, a latent image. In both, heat settable particles are generally employed. These toner particles are affixed permanently to the sheet by the application of heat thereto, i.e. fusing. Hereinafter, an electrophotographic printing machine will be discussed as an illustrative embodiment of the printing process.

In electrophotographic printing, a charged photoconductive member is exposed to a light image of an original document. The light image selectively dissipates the charge to record thereon an electrostatic latent image. A development system, thereupon, desposits toner particles onto the latent image rendering it visible. The toner powder image is transferred from the photoconductive surface to the sheet of support material. As hereinbefore indicated, the toner particles are generally made from fusable resins. When such toner particles are transferred to the sheet of support material, the powder image may be permanently affixed thereto by the application of heat. Heating the toner powder image partially dissolves the toner particles causing them to fuse into the sheet of support material.

Multi-color electrophotographic printing repeats the foregoing process a plurality of times for differently colored light image. Each development cycle deposits differently colored toner particles on the support material, in superimposed registration with the previously deposited layer of toner particles. In this way, the support material will have a multi-layered toner powder image deposited thereon. This multi-layered toner powder image is heated to coalesce. At this point in time it becomes transparent, i.e. each toner layer modulates the light rays passing therethrough, to form a copy having a single composite color. The modulated light rays transmitted through the toner layers to the eye of the observer. The observer thereupon sees only the resultant composite colors of the copy, i.e. those colors corresponding to the original document being reproduced.

In heating the toner powder image, it is preferable to raise the temperature of the support material so that it is substantially the same as the fusing temperature of the toner particles. In this manner, the support material functions as a heat source rather than a heat sink during the fusing operation. A suitable fusing apparatus may include a pair of heat sources, one to heat the support material and the other to heat the toner powder image. Various types of fusing systems have been developed which permit heating of the support material, as well as applying radiant heat to the toner particles disposed thereon. Exemplary of one such fusing apparatus for use in multi-color electrophotographic printing machine is described in U.S. Pat. No. 3,826,892 issued in 1974 to Draugelis et al. This fusing apparatus utilizes a radiant energy source and heated support material transport. The control system of the present invention will be described hereinafter, in conjunction with a fusing apparatus of this type. In operation, the radiant energy source and transport heat source operate in conjunction with one another to coalesce and affix the multi-layered toner powder image to the support material. The foregoing is achieved without charring or igniting the support material. Hence, the radiant energy source and transport heat source are controlled to insure that the temperature of the support material, with the multi-layered toner powder image deposited thereon, is appropriately regulated.

A control system hereinbefore utilized in conjunction with radiant heaters and transport heaters is described in U.S. Pat. No. 3,781,516 issued to Tsilibes et al. in 1973. As described therein, the fuser controller employs zero crossing and cycle stealing to regulate the power of the radiant heaters and support material transport heaters so that the proper amount of heat is available for fusing. However, a control system of this type requires approximately 45 minutes to 1 hour to set-up and adjust after assembly. In addition, it also somewhat difficult to maintain this fuser in an operating mode over the wide range of power levels required for multi-color fusing. Thus, this system may be expensive to manufacture and optimum reliability. Moreover, numerous active devices rather than passive devices are required for its implementation. Finally, the system utilizes a significant amount of power.

Accordingly, it is the primary object of the present invention to improve the control system regulating the heaters of a fusing apparatus arranged to affix permanently single or multi-layered toner powder images onto a sheet of support material.

SUMMARY OF THE INVENTION

Briefly stated, and in accordance with the present invention there is provided a control system for regulating the thermal energy produced by a first heat source and a second heat source cooperating therewith.

This is achieved, in the present instance, by first control means and second control means. Pursuant to the features of the present invention, the first control means is responsive to the deviation between the measured temperature in the region of the first heat source and a pre-selected temperature reference. In this manner, the phase of the voltage applied to the first heat source and second heat source is adjusted by the first control means to maintain the RMS voltage applied thereto substantially at a pre-selected level. Further, in accordance with the features of the present invention, the second control means is responsive to the deviation between the measured temperature in the region of the first heat source and the measured temperature in the region of the second heat source. This enables the second control means to also adjust the phase of the voltage applied to the first heat source and second heat source maintaining the RMS voltage applied thereto substantially at a pre-selected level.

BRIEF DESCRIPTION OF THE DRAWINGS

Other objects and advantages of the present invention will become apparent upon reading the following detailed description and upon reference to the drawings, in which.

While the present invention will be described in connection with the preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
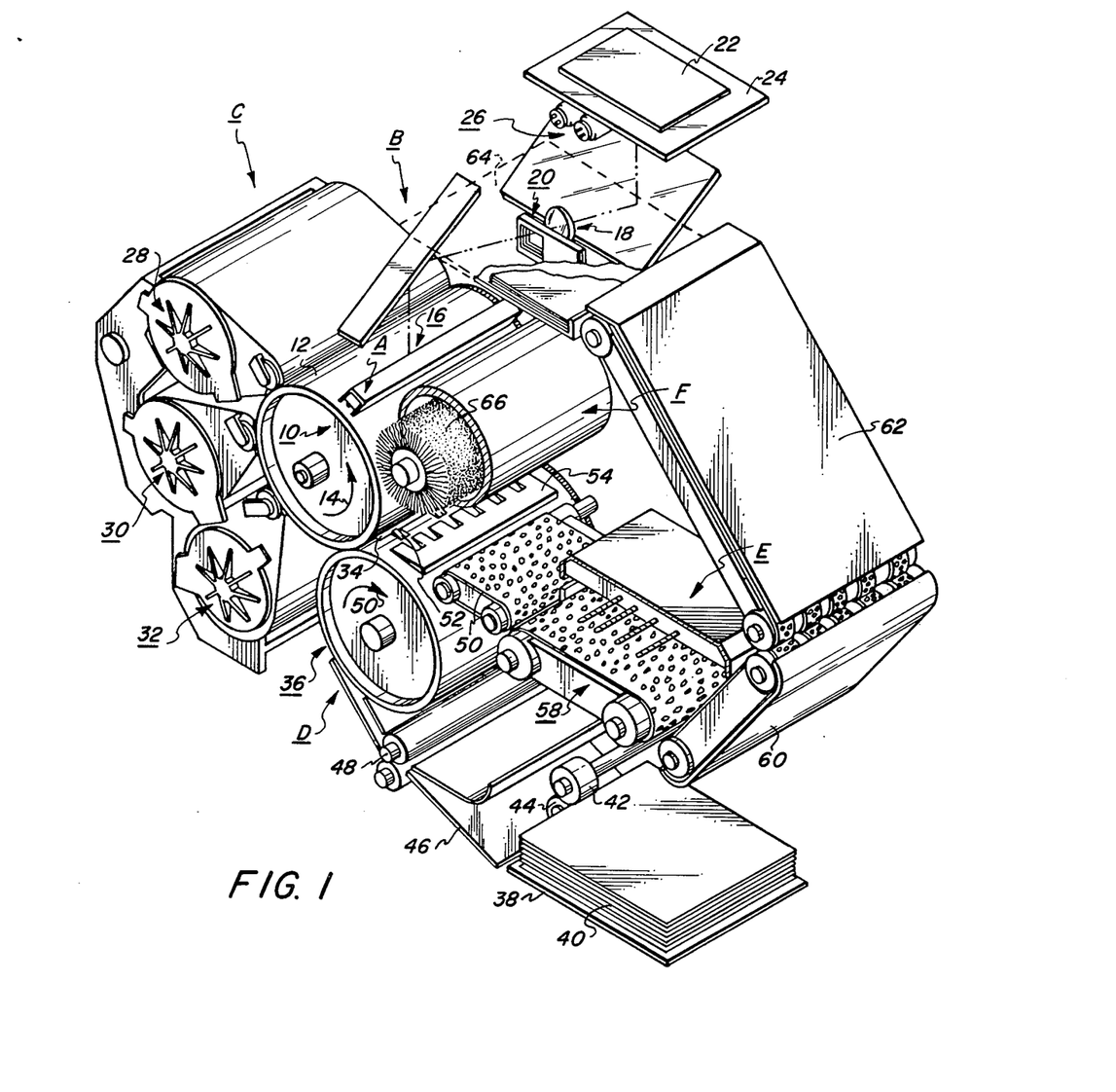
FIG. 1 is a schematic perspective view of an electrophotographic printing machine incorporating the features of the present invention therein.

With continued reference to the drawings, wherein like reference numerals have been used throughout to designate like elements, FIG. 1 schematically illustrates a multi-color electrophotographic printing machine incorporating the features of the present invention therein. The electrophotographic printing machine shown in FIG. 1 illustrates the various components utilized therein for producing multi-color copies from a colored original document. Although the control system of the present invention is particularly well adapted for use in conjunction with the fusing apparatus employed in the FIG. 1 electrophotographic printing machine, it should become evident from the following description that it is equally well suited for use in a wide variety of applications and is not necessarily limited to the particular embodiment shown herein.

Referring now to FIG. 1, the printing machine employs a photoconductive member having a drum 10 mounted rotatably within the machine frame (not shown). Photoconductive surface 12 is secured to and entrained about the exterior circumferential surface of drum 10. A suitable photoconductive material may be an alloy of polychromatic selenium such as is described in U.S. Pat. No. 3,655,377 issued to Sechak in 1972. Drum 10 rotates in the direction of arrow 18 to pass through a series of processing stations.

Initially, drum 10 moves photoconductive surface 12 through charging station A. Charging station A has positioned thereat a corona generating device, indicated generally at 16, which charges photoconductive surface 12 to a relatively high substantially uniform potential. Preferably, corona generating device 16 is of a type described in U.S. Pat. No. 3,875,407 issued to Hayne in 1975.

Thereafter, drum 10 rotates the charged portion of photoconductive surface 12 to exposure station B. At exposure station B, a color filtered light image of the original document irradiates the charged portion of photoconductive surface 12. Exposure station B includes a moving lens system, generally designated by the reference numeral 18, and a color filter mechanism, shown generally at 20. A suitable moving lens system is disclosed in U.S. Pat. No. 3,062,108 issued to Mayo in 1962. U.S. Pat. No. 3,775,006 issued to Hartman et al. in 1973 describes a suitable color filter mechanism. An original document 22, such as a sheet of paper, book, or the like, is placed face down upon transparent viewing platen 24. Lamp assembly 26, lens system 18, and filter mechanism 20 move in a timed relationship with drum 10 to scan successive incremental areas of original document 22 disposed upon platen 24. In this way, a flowing light image of original document 22 is projected onto the charged portion of photoconductive surface 12 to record an electrostatic latent image thereon. Filter mechanism 20 is adapted to interpose selected color filters into the optical light path. The selected color filter operates on the light rays passing through lens 18 to produce an electrostatic latent image on photoconductive surface 12 which corresponds to a pre-selected spectral region of the electromagnetic wave spectrum, hereinafter referred to as a single color electrostatic latent image.

Subsequent to exposure, drum 10 rotates the single color electrostatic latent image recorded on photoconductive surface 12 to development station C. At development station C, three individual developer units, generally indicated by the reference numerals 28, 30 and 32, respectively, render the latent image visible by depositing toner particles thereon. A suitable development station employing a plurality of developer units is disclosed in U.S. Pat. No. 3,854,449 issued to Davidson in 1974. As described therein, the developer units are all of type referred to generally as magnetic brush developer units. A typical magnetic brush developer unit utilizes a magnetizable developer mix comprising carrier granules and toner particles. The developer mix is continually brought through a directional flux field to form a brush thereof. The electrostatic latent image recorded on photoconductive surface 12 is developed by bringing the brush of developer mix into contact therewith. Each of the respective developer units contain differently colored toner particles. The toner particles within the respective developer units correspond to the complement of the spectral region of the wave length of light transmitted through filter 20. For example, a green filtered electrostatic latent image is developed with green absorbing magenta toner particles. Similarly, blue and red latent images are developed with yellow and cyan toner particles, respectively.

Drum 10, with the toner powder image adhering electrostatically to photoconductive surface 12, is next rotated to transfer station D. At transfer station D, the toner powder image is transferred from photoconductive surface 12 to a sheet of support material 34. Support material 34 may be, amongst others, plain paper, or a plastic sheet. A transfer roll, shown generally at 36, is located at transfer station D. Transfer roll 36 recirculates support material 34 and is electrically biased to a potential of sufficient magnitude and polarity to attract toner particles from the latent image recorded on photoconductive surface 12 to the sheet of support material 34 adhering thereto. A suitable electrically biased transfer roll is described in U.S. Pat. No. 3,612,677 issued to Langdon et al. in 1971. As shown in FIG. 1, transfer roll 36 rotates in the direction of arrow 38 in synchronism with drum 10, i.e. at the same tangential velocity. Successive toner powder images are transferred from photoconductive surface 12 to support material 34, in superimposed registration with one another. Prior to proceeding with the remaining processing statons, the sheet feeding path will be briefly described.

The sheet feeding apparatus includes a support tray 38 upon which a stack 40 of support material 34 is disposed. Feed roll 42, in operative communication with retard roll 44, advances and separates the uppermost sheet from stack 40. The advancing sheet moves into chute 46 which directs it into the nip between register rolls 48. As transfer roll 36 rotates in the direction of arrow 50, gripper fingers 52 mounted thereon receive the advancing sheet. After a plurality of toner powder images have been transferred to support material 34, gripper fingers 52 space support material 34 from transfer roll 36. This enables stripper bar 54 to be interposed therebetween separating support material 34 from transfer roll 36. Endless belt conveyor 56 advances support material 34 to fixing station E. At fixing station E, a fusing apparatus, indicated generally at 58, coalesces the transferred toner powder image to support material 34. Fusing apparatus 58 is of the type hereinbefore mentioned as being described in U.S. Pat. No. 3,826,892 issued to Draugelis et al. in 1974, and will be discussed hereinafter in greater detail with reference to FIGS. 2 and 3. After a plurality of toner powder images have been affixed permanently to support material 34, support material 34 is advanced by endless belt conveyors 60 and 62 to catch tray 64 for subsequent removal therefrom by the machine operator.

Frequently, residual toner particles remain on photoconductive surface 12 after the transfer operation. These residual toner particles are removed from photoconductive surface 12 at cleaning station F. Initially, the residual toner particles are brought under the influence of a cleaning corona generating device (not shown) adapted to neutralize the electrostatic charge remaining on the toner particles and photoconductive surface 12. The neutralized toner particles are then cleaned from photoconductive surface 12 by a rotatably mounted fibrous brush 66 in contact therewith. A suitable brush cleaning device is described in U.S. Pat. No. 3,590,412 issued to Gerbasi in 1971.

It is believed that the foregoing description is sufficient for purposes of the present application to illustrate the general operation of an electrophotographic printing machine embodying the teachings of the present invention therein.

Figure 2:
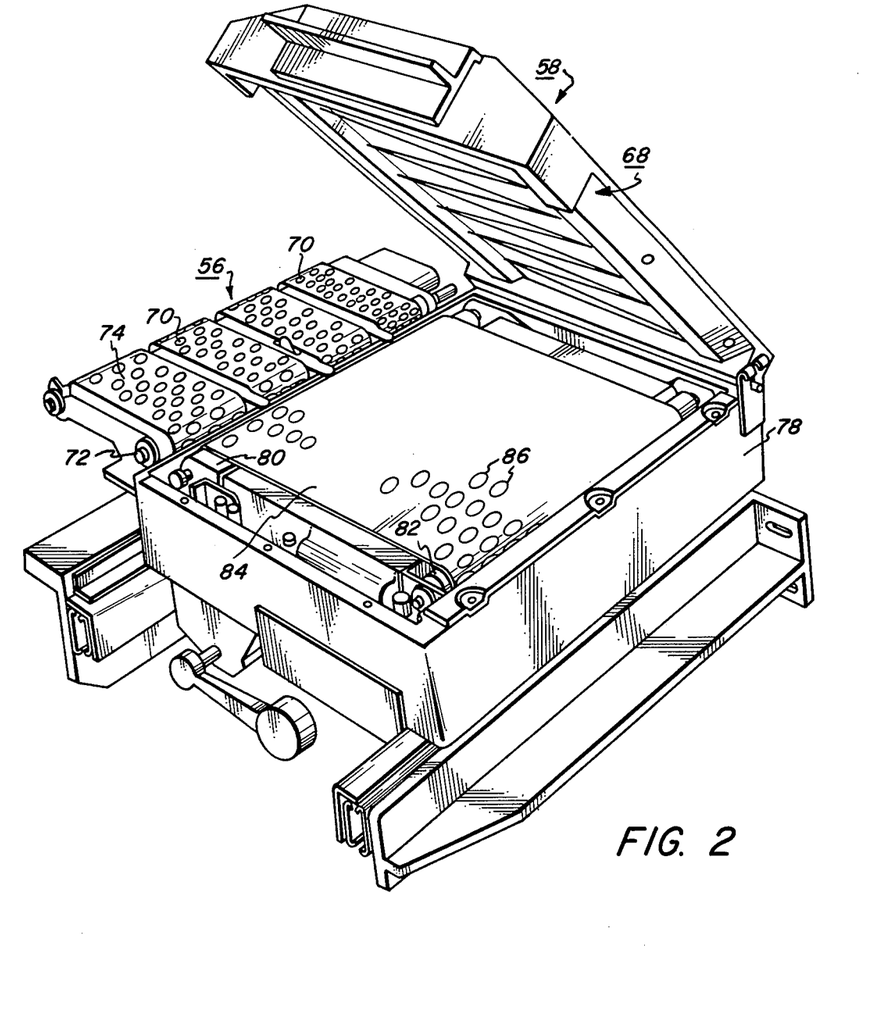
FIG. 2 is a perspective view of a fusing apparatus employed in the FIG. 1 printing machine.

Referring now to the specific subject matter of the present invention, FIG. 2 depicts a perspective view of fusing apparatus 58 which is employed in the electrophotographic printing machine of FIG. 1. Fusng apparatus 58 is described in greater detail in U.S. Pat. No. 3,826,892 issued to Draugelis et al. in 1974, the relevant portions thereof being incorporated into the present application. As shown in FIG. 2, cover 68 of fuser 58 is pivoted to an opened position. Conveyor 56, associated with fuser 58 for transporting support material 34 from transfer roll 36 thereto, includes a plurality of endless belts 70 entrained about a pair of opposed spaced rollers 72. A vacuum system maintains a low pressure by drawing air through apertures 74 of belt 70 to tack support material 34 thereto. Cover 68 includes radiant energy source 76. Lower housing 78 defines an open-ended chamber having a pair of opposed spaced rollers 80 and 82 mounted rotatably on a transport frame disposed therein. An endless belt 84 is entrained about rollers 80 and 82. Endless belt 84 includes a plurality of apertures 86 which are arranged to draw air therethrough such that support material 34 is tacked thereto as it passes through fuser 58. Preferably, cover 68 is made from a sheet metal shell having suitable insulation secured to the interior surface thereof. A nylon fiber coating is sprayed on the exterior surface of cover 68 to protect the operator. An outer reflector is attached to the insulation secured to the interior surface of the metal shell. An inner reflector is mounted on the outer reflector. The inner and outer reflectors are spaced from one another permitting air to circulate therebetween. Sensing means or a thermistor 226 (FIG. 7) is positioned in the air space between the inner and outer reflectors to measure the temperature thereat. One type of suitable thermistor for detecting the temperature in the air space between the inner and outer reflectors is a glass bead thermistor. Preferably, the radiant energy source or radiant heat strip 76 is a nickel chromium alloy ribbon entrained helically about a pair of opposed spaced support member such as ceramic spools. Heat strip 76 is arranged to provide substantially uniform radiation. A suitable guide, preferably quartz woven string, is wound over heat strip 76 to prevent support material 34 from contacting it.

Figure 3:
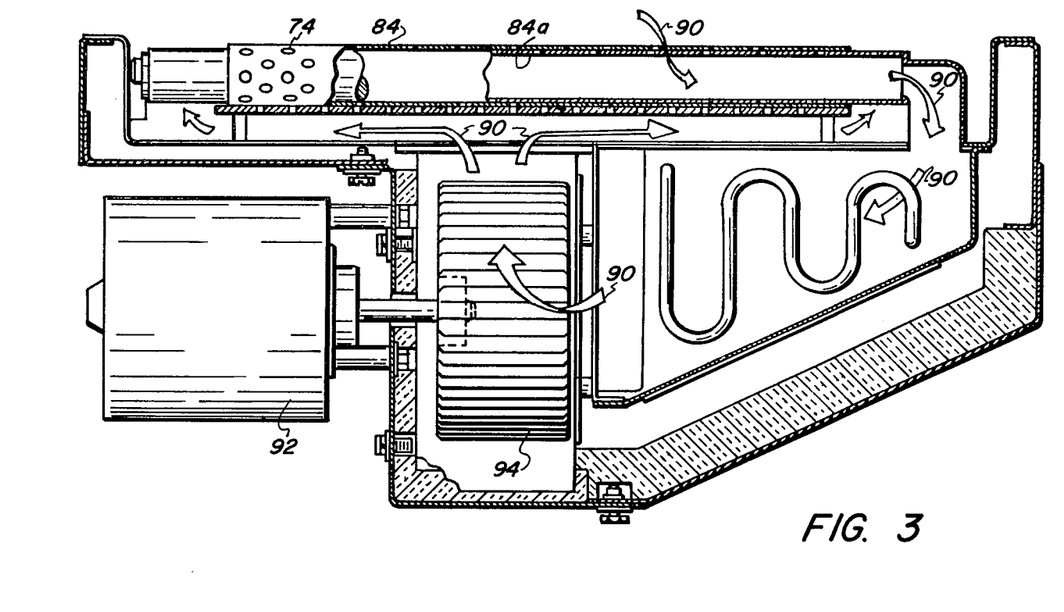
FIG. 3 is a sectional elevational view of the FIG. 2 fusing apparatus.

Turning now to FIG. 3, there is shown a sectional view of lower housing 78. Lower housing 78 includes a sheet metal shell having insulation secured to the interior surface thereof. The transport frame is mounted removably in the shell. Rollers 80 and 82 are mounted rotatably on the frame and have entrained thereabout endless belt 84. Interior surface 84b of endless belt 84 is adapted to be closely adjacent to plate 88. Plate 88 is adapted to be heated by air moving in the direction of arrows 90. Blower 92 has a vaned member 94 mounted thereon. Vaned member 94 is adapted to produce an air flow in the direction of arrows 90. The air flow passes over heating means or auxiliary heater 96 onto plate member 88 raising the temperature thereof. Plate member 88 is closely adjacent to under surface 84b of endless belt 84 and transmits heat thereto. This, in turn, raises the temperature of support material 34 minimizing any heat loss therefrom. In this manner, radiant energy from heat strip 76, in conjunction with heat from auxiliary heater 96, coalesces the multi-layered toner powder image formed on support material 34. Preferably, auxiliary heater 96 is an 800 watt tubular high mass heater. Sensing means or a can enclosed bead thermistor 208 (FIG. 6) is arranged to detect the temperature of endless belt 84. The bead thermistor is mounted on a thermally conductive shoe which, in turn, is adapted to contact lower surface 84b of belt 84. Preferably, blower motor 92 is a two-phase split capacitor motor and is adapted to maintain a pressure differential of suitable magnitude to tack support material 34 to exterior surface 84a of endless belt 84.

Figure 4:
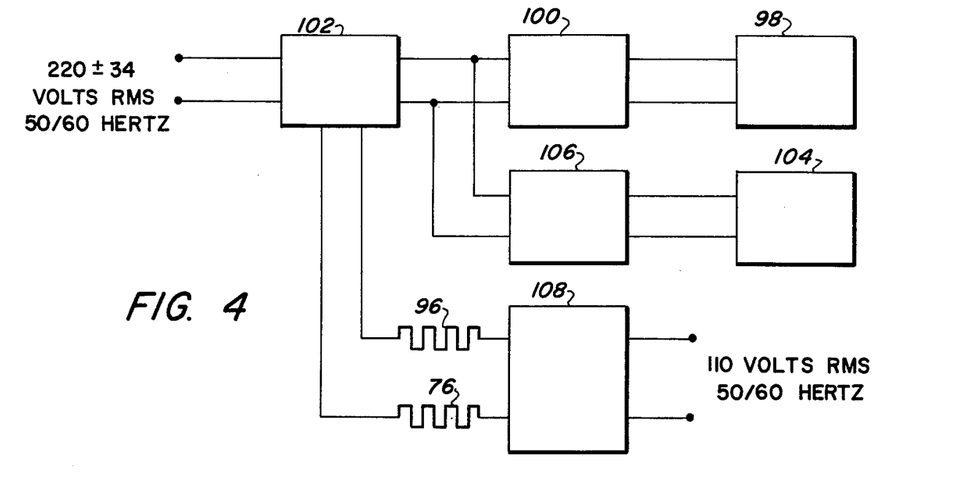
FIG. 4 is a schematic diagram of the electrical circuitry employed to regulate the heaters of the FIG. 2 fusing apparatus.

Turning now to FIG. 4, the functional block diagram is shown thereat for regulating radiant heater 76 and auxiliary heater 96. Circuit 98 detects the temperature in the region of auxiliary heater 96 and compares it to a temperature reference. Thereupon, an electrical error signal is developed therefrom. The electrical error signal energizes circuit 100 which cooperates with circuit 102 to adjust the phase shift of the voltage supplied to auxiliary heater 96 and radiant strip 76. This maintains the voltage applied to auxiliary heaters 96 and radiant heater 76 at a pre-selected level, i.e. preferably about 180 volts. It should be noted that circuit 98 actuates circuit 100. When circuit 98 does not detect a temperature difference, circuit 100 is not actuated and voltage is not applied to auxiliary heater 96 and radiant heater 76. Preferably, circuit 102 is energized by a 220 ± 34 volt RMS source at 50 or 60 hertz.

Figure 5:
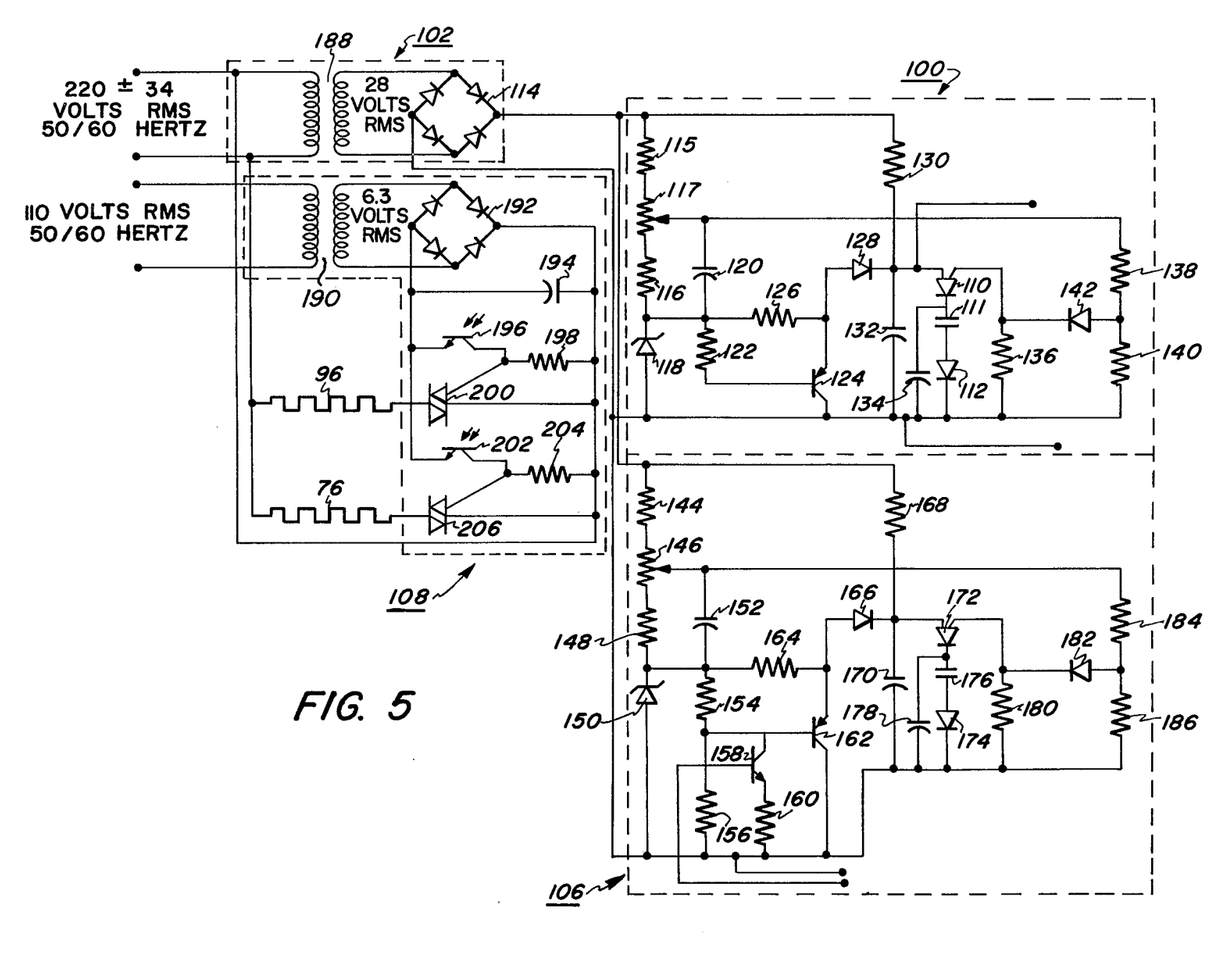
FIG. 5 is an electrical circuit diagram illustrating the electrical components utilized in the FIG. 4 schematic diagram.
Figure 6:
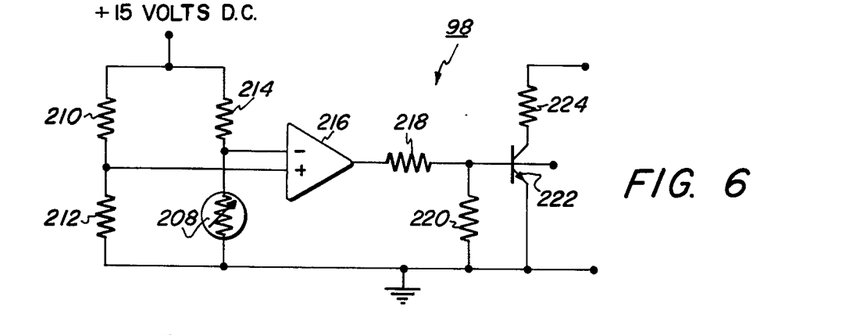
FIG. 6 is an electrical circuit diagram showing the electrical components employed in the FIG. 4 schematic diagram.
Figure 7:
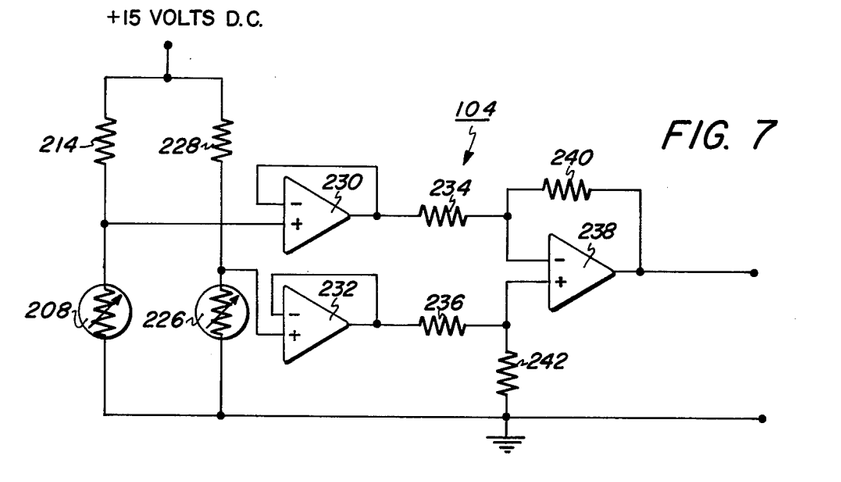
FIG. 7 is an electrical circuit diagram depicting the electrical components utilized in the FIG. 4 schematic diagram.

Circuit 104 is adapted to measure the temperature difference between the temperature in the region of auxiliary heater 96 and radiant heater 76. This circuit compares the difference and generates an error signal indicative thereof. Circuit 104 energizes circuit 106 which, in conjunction with circuit 102, adjusts the phase shift of the voltage applied to auxiliary heater 96 and radiant heater 76 to a pre-selected constant level, i.e. about 180 volts. Once again, it should be noted that only when circuit 104 develops an electrical output signal, i.e. an error signal indicative of the difference between the measured temperature in the region of auxiliary heater 96 and radiant heater 76, will circuit 106 be actuated. Only when circuit 106 or circuit 100 is actuated will a voltage of about 180 volts be applied to radiant heaters 96 and 76. At other times, radiant heaters 96 and 76 will be de-energized. Thus, this type of system is an on-off type of system having a constant amplitude with the phase being adjustable to maintain a constant amplitude. Finally, circuit 108 is energized at about 110 volts at 50 or 60 hertz. Circuit 108 compensates for fluctuations in the external voltage being furnished thereto. Thus, any voltage variations in the line are suitably adjusted by circuit 108 to provide a constant voltage excitation level to radiant heaters 76 and auxiliary heater 96, e.g. about 110 volts RMS. The detailed circuitry associated with each of the schematic diagrams in FIG. 4 will be discussed hereinafter with reference to FIGS. 5, 6 and 7. More particulary, FIG. 5 depicts the elements incorporated into schematic block diagrams, 100, 102, 106 and 108. FIG. 6 depicts the circuit elements employed in schematic block diagram 98, and FIG. 7 illustrates the circuit elements employed in schematic block diagram 104.

Turning now to FIG. 5, circuits 100 and 106 regulate the voltage across heaters 76 and 96. The voltage is maintained at substantially about 180 ± 3 volts RMS at 50 or 60 hertz. This is achieved by sensing the peak level voltage changes of a 28 volt RMS, 50 or 60 hertz, transformer secondary that results from a primary transformer voltage of 220 ± 34 volts, RMS at 50 or 60 hertz. This transformer voltage supplies heaters 76 and 96 and the primary of the transformer. The sensing circuit, i.e. circuit 100, causes the firing point of a programmable unijunction transistor 110 to vary, thereby enabling power triac 112, that fires in coincidence with transistor 110, to allow just the correct amount of each cycle to be applied to the load, i.e. heaters 96 and 76. This results in an RMS voltage of 180 volts. For example, if the voltage was low, i.e. 186 volts, the firing point would have come very early in the cycle to result in the 180 volts RMS. Contrawise, if the voltage was high, i.e. 254 volts, the firing point would be pushed back 90° in the cycle to affect 180 volts RMS across heaters 96 and 76. The foregoing is achieved by circuits 100 and 106.

Referring now to detailed description of these circuits, half-wave diode rectifying circuit 114 is connected in parallel with the secondary of transformer 188. Rectifying circuit 114 of circuit 100 is connected in series with resistor 115, variable resistor 116, and resistor 117, which, in turn, are coupled to a transistor 118. Capacitor 120 is connected in parallel with resistor 116. Resistor 122 is coupled in series with capacitor 120 and also connected to transistor 124. Resistor 126 is connected to capacitor 120 and resistor 122. Transistor 128 is connected in series with transistor 124. Resistor 126 is connected between transistors 128 and transistor 124. Resistor 130 is connected in series with rectifying circuit 114 and to transistor 128. Capacitor 132 is connected in series with resistor 130 and transistor 128. Capacitor 132 is coupled in parallel with transistor 110. Transistor 110 is connected in series with emittor 11 of photocoupler 200, which gates triac 112. Circuit 98 (FIG. 6) excites transistor 110 firing triac 112. Capacitor 134 is connected in parallel with triac 112. Resistor 136 is coupled in parallel with transistor 110 and triac 112. Resistors 138 and 140 are connected in series with one another and in parallel with the remaining elements of the circuit. Transistor 142 is coupled to resistors 138 and 140. In addition, transistor 142 is connected to resistor 136.

Referring now to circuit 106, this circuit is connected in parallel with rectifying circuit 114. Circuit 106 includes a resistor 144 connected in series with a variable resistor 146. Variable resistor 146 is coupled, in series, with resistor 148, which, in turn, is connected in series to transistor 150. Capacitor 152 is coupled in parallel with variable resistor 146 and resistor 148. Resistor 154 is connected in series with capacitor 152 and in parallel with transistor 150. Resistor 156 is connected in series with resistor 154. The maximum power furnished to radiant heater 76 is adjustable and operator selectable. This is achieved by selecting the value of resistor 156. Transistor 158 is connected in series with resistor 154 and resistor 160. Circuit 104 is connected to transistor 158 and to resistor 160. In this manner, circuit 104 excites transistor 172 firing triac 174. Transistor 162 is coupled to transistor 158, and resistors 154 and 156. Resistor 164 is connected to resistor 148, transistor 150, capacitor 152, and resistor 154. In addition, resistor 164 is coupled to transistor 162 and transistor 166. Transistor 166 is connected to resistor 168 which is coupled to rectifying circuit 114. Resistor 168 is also connected to capacitor 170. Capacitor 170 is coupled in parallel to transistor 172. Transistor 172 is connected, in series, with emitter 176 of photocoupler 206 which gates triac 174. Capacitor 178 is coupled triac 174, in parallel therewith. Capacitor 170 is connected in parallel with transistor 172, relay 176, and triac 174. Resistor 180 is connected in series with transistor 172. Transistor 182 is connected with resistor 180 and resistors 184 and 186. Resistor 184 and 186 are connected in series with one another and in parallel with capacitors 152, resistor 154 and resistor 156.

As previously noted, circuit 100 and circuit 106 are connected in parallel with circuit 102.

Turning now to a brief description of circuit 102, circuit 102 includes rectifying circuit 114 which is connected in parallel with the secondary of transformer 188. The primary of transformer 188 is connected to radiant heater 76 and auxiliary heater 96. Circuit 108 is also connected to radiant heater 76 and auxiliary heater 96.

Circuit 108 includes transformer 190. Transformer 190 has the primary thereof excited at 110 volts RMS at 50 or 60 hertz. The secondary of transformer 190 is energized at 6.3 volts RMS. Diode rectifying circuit 192 is coupled in parallel, to the secondary of transformer 190. Capacitor 194 is connected in parallel with rectifying circuit 192. Triac 196 is connected in series with resistor 198. Both of the foregoing elements are coupled, in parallel, to capacitor 194. The output from triac 196 and resistor 198 is connected to transistor 200 (photocoupler), which, in turn, is connected to auxiliary heater 96. The output of triac 196 is connected to triac 202. Resistor 204 is connected to triac 202. Triac 202 and resistor 204 are connected in parallel with triac 196 and resistor 198. The output from triac 202 and resistor 204 is connected to transistor 206 (photocoupler), which, in turn, is connected to radiant heater 76. The foregoing circuitry regulates the excitation voltage applied to auxiliary heater 96 and radiant heater 76 to maintain this voltage stable and to compensate for any line voltage variations.

By way of example, Table 1 presents a summary of the preferred values of the resistance and capacitive elements of FIG. 5. The table summarizes the nominal values of the capacitors and resistors utilized therein by reference numeral.

TABLE I

| Resistor No. | Nominal Value Ohms | Capacitor No. | Nominal Value Microfarads |
|---|---|---|---|
| 115 | 750 | 120 | 250 |
| 116 | 100 | 132 | 0.1 |
| 117 | 750 | | |
| 122 | 8.66K | 134 | 0.1 |
| 126 | 560 | 152 | 250 |
| 130 | 392K | 170 | 0.1 |
| 136 | 1M | 178 | 0.1 |
| 138 | 29.4K | 194 | 0.1 |
| 140 | 24.9K | | |
| 144 | 750 | | |
| 146 | 100 | | |
| 148 | 750 | | |
| 154 | 8.66K | | |
| 156 | Selectable | | |
| 160 | 20K | | |
| 164 | 560 | | |
| 168 | 392K | | |
| 180 | 1M | | |
| 184 | 29.4K | | |
| 186 | 24.9 | | |
| 198 | 1K | | |
| 204 | 1K | | |

Turning now to FIG. 6, there is shown, in detail, the circuit elements of circuit 98. The function of this circuit is to maintain a constant temperature, the level of which is determined through a set point established by a thermistor and resistor junction connected to an operational amplifier. The amplifier will switch on and off when the set point temperature is reached. The amplifier is, in turn, connected to the anode of transistor 110 (FIG. 5). This effects control of heaters 76 and 96. Thus, thermistor 208 measures the temperature in the region of auxiliary heater 96 and develops a signal proportional thereto. This signal is compared to a reference level and an error signal developed thereby. The error signal is employed to energize circuit 100. Circuit 98 is excited by a +15 volt D.C. regulated voltage source. Resistors 210 and 212 are connected in series with the voltage source. Resistor 214 and thermistor 208 are connected in parallel with resistors 210 and 212. Operational amplifier 216 is connected to thermistor 208 and resistor 214. In addition, resistors 210 and 212 are also coupled to operational amplifier 216.

The output from operational amplifier 216 is connected to resistor 218. Resistor 220 is connected in parallel with resistor 214, operational amplifier 216, and resistor 218. Resistors 218 and 220 are coupled to transistor 222 which, in turn, is connected to resistor 224. Circuit 98, as hereinbefore described, controls energization of circuit 100.

Table 2 presents exemplary preferred values for the resistive elements of FIG. 6. These values are the nominal values of the resistors utilized therein and are identified by reference numeral.

TABLE 2

| Resistor No. | Nominal Value Ohms |
|---|---|
| 210 | 22K |
| 212 | 22K |
| 214 | 13.3K |
| 218 | 2.7K |
| 220 | 1K |
| 224 | 470 |

Referring now to FIG. 7, circuit 104 is discussed therein in greater detail. Circuit 104 is a transistor circuit which is controlled throughout its linear region by the output of a differential voltage circuit that drives the transistor harder when the temperature differentials sensed between the auxiliary heaters and radiant heaters increases. The output of the transistor then controls the anode of transistor 172 through an emitter follower transistor stage.

Circuit 104 employs thermistor 226 to measure the temperature in the region of radiant heater 76. The measured temperature in the region of the radiant heater 76 is compared with the measured temperature in the region of the auxiliary heater 96 to produce an error signal. This error signal energizes circuit 106. Thermistor 208 is connected to resistor 214. Resistor 214 and thermistor 208 are coupled to a regulated D.C. voltage source of 15 volts. In addition, thermistor 226 is connected in series with resistor 228 which, in turn, is also connected to the regulated voltage source. Resistor 228 and thermistor 226 are connected, in parallel, to thermistor 208 and resistor 214. Resistors 214 and thermistor 208 are connected to operational amplifier 230. Resistors 228 and thermistor 226 are coupled to operational amplifier 232. Operational amplifier 230 is connected, in series, with resistor 234. Operational amplifier 232 is connected, in series, with resistor 236. Resistors 234 and 236 are coupled to operational amplifier 238. Resistor 240 is connected, in parallel, to operational amplifier 238, which, in turn, is connected to resistor 234. Resistor 242 is connected to operational amplifier 238 and resistor 236. Resistor 242 is grounded. The foregoing elements of circuit 104 are connected to circuit 106 so as to periodically energize this circuit. Circuit 106 is only energized when circuit 104 develops an error signal. Table 3 presents a summary of the preferred values for the resistive capacitive elements of FIG. 7. This table summarizes the nominal values of the resistors utilized in circuit 104 and are referred thereto by reference numeral.

TABLE 3

| Resistor No. | Nominal Value Ohms |
|---|---|
| 228 | 33K |
| 234 | 10K |
| 236 | 10K |

TABLE 3-continued

| Resistor No. | Nominal Value Ohms |
|---|---|
| 240 | 47K |
| 242 | 47K |

By way of example, the regulated temperature in the region of auxiliary heater 96 ranges from about 390° to about 420° F, while the temperature in the region of radiant heaters 76 is about 440° F.

In recapitulation, a first controller, responsive to the deviation between the measured temperature in the region of the auxiliary heaters and a pre-selected temperature reference, adjusts the phase of the voltage applied to the radiant and auxiliary heaters. This maintains the RMS voltage applied to these heaters substantially at a pre-selected level. A second controller, responsive to the deviation between the measured temperature in the region of the auxiliary heater and the measured temperature in the region of the radiant heater also adjusts the phase of the voltage applied to the radiant and auxiliary heaters. This also maintains the RMS voltage applied thereto substantially at the pre-selected level. Hence, the control system of the present invention is adapted to regulate the temperature of the fusing apparatus incorporated into an electrophotographic printing machine so as to permanently affix single or multi-layered toner powder images to a sheet of support material.

Thus, it is apparent that there has been provided, in accordance with the present invention, a control system that fully satisfies, the objects, aims and advantages hereinbefore set forth. While this invention has been disclosed in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A control system for regulating the thermal energy produced by a first heat source and a second heat source cooperating therewith, including:
    first control means, responsive to the deviation between the measured temperature in the region of the first heat source and a pre-selected temperature reference, for regulating the phase of the voltage applied to the first heat source and second heat source maintaining the RMS voltage applied thereto substantially at a pre-selected level; and
    second control means, responsive to the deviation between the measured temperature in the region of the first heat source and the measured temperature in the region on the second heat source, for regulating the phase of the voltage applied to the first heat source and second heat source maintaining the RMS voltage applied thereto substantially at a pre-selected level.

2. A control system as recited in claim 1, wherein said first control means includes:
    means for generating an error signal indicative of the deviation between the measured temperature in the region of the first heat source and a pre-selected temperature reference; and
    means, coupled to the first heat source and the second heat source, for adjusting the phase of the voltage applied to the first heat source and second heat source maintaining the RMS voltage applied thereto substantially at the pre-selected level, said adjusting means being energized by the error signal from said generating means.

3. A control system as recited in claim 2, wherein said generating means includes:
    means for sensing the temperature in the region of the first heat source and generating an electrical output signal corresponding thereto;
    means for developing a reference corresponding to the pre-selected temperature; and
    means for comparing the electrical output signal from said sensing means to the reference from said developing means for generating an error signal indicative of the difference therebetween.

4. A control system as recited in claim 1, wherein said second control means includes:
    means for generating an error signal indicative of the deviation between the measured temperature in the region of the first heat source and the measured temperature in the region of the second heat source; and
    means, coupled to the first heat source and the second heat source, for adjusting the phase of the voltage applied to the first heat source and the second heat source maintaining the RMS voltage applied thereto substantially at the pre-selected level, said adjusting means being energized by the error signal from said generating means.

5. A control system as recited in claim 4, wherein said generating means includes:
    means for sensing the temperature in the region of the first heat source and forming an electrical output signal corresponding thereto;
    means for sensing the temperature in the region of the second heat source and forming an electrical output signal corresponding thereto; and
    means for comparing the electrical output signal corresponding to the sensed temperature in the region of the first heat source with the electrical output signal corresponding to the sensed temperature in the region of the second heat source to form an error signal indicative of the difference therebetween.

6. An electrostatographic printing machine of the type having a fusing apparatus wherein the thermal energy produced by a first heat source and a second heat source cooperating therewith is controlled, including:
    first control means, responsive to the deviation between the measured temperature in the region of the first heat source and a pre-selected temperature reference, for regulating the phase of the voltage applied to the first heat source and second heat source maintaining the RMS voltage applied thereto substantially at a pre-selected level; and
    second control means, responsive to the deviation between the measured temperature in the region of the first heat source and the measured temperature in the region of the second heat source, for regulating the phase of the voltage applied to the first heat source and second heat source maintaining the RMS voltage applied thereto substantially at a pre-selected level.

7. A printing machine as recited in claim 6, wherein said first control means includes:

means for generating an error signal indicative of the deviation between the measured temperature in the region of the first heat source and a pre-selected reference temperature; and means, coupled to the first heat source and the second heat source, for adjusting the phase of the voltage applied to the first heat source and second heat source maintaining the RMS voltage applied thereto substantially at the pre-selected level, said adjusting means being energized by the error signal from said generating means.

8. A printing machine as recited in claim 7, wherein said generating means includes:

means for sensing the temperature in region of the first heat source and generating an electrical output signal corresponding thereto;

means for developing a reference corresponding to the pre-selected temperature; and means for comparing the electrical output signal from said sensing means to the reference from said developing means for generating an error signal indicative of the difference therebetween.

9. A printing machine as recited in claim 6, wherein said second control means includes:

means for generating an error signal indicative of the deviation between the measured temperature in the region of the first heat source and the measured temperature in the region of the second heat source; and means, coupled to the first heat source and the second heat source, for adjusting the phase of the voltage applied to the first heat source and the second heat source maintaining the RMS voltage applied thereto substantially at the pre-selected level, said adjusting means being energized by the error signal from said generating means.

10. A printing machine as recited in claim 9, wherein said generating means includes:

means for sensing the temperature in the region of the first heat source and forming an electrical output signal corresponding thereto;

means for sensing the temperature in the region of the second heat source and forming an electrical output signal corresponding thereto; and means for comparing the electrical output signal corresponding to the sensed temperature in the region of the first heat source with the electrical output signal corresponding to the sensed temperature in the region of the second heat source to form an error signal indicative of the difference therebetween.

* * * * *